United States Patent [19]

Habermann

[11] 3,776,059
[45] Dec. 4, 1973

[54] WELDED CABLE PULLEY
[76] Inventor: Rudi Habermann, Kirchstrasse 58, D-4006 Erkrath near Duesseldorf, Germany
[22] Filed: May 9, 1972
[21] Appl. No.: 251,714

[52] U.S. Cl. ............................................. 74/230.5
[51] Int. Cl. ........................................... F16h 55/36
[58] Field of Search ............... 74/230.5, 238, 230.8, 74/230.3, 230.4; 29/159 R

[56] References Cited
UNITED STATES PATENTS
2,620,675  12/1952  Meadows et al. .................. 74/230.8
862,350  8/1907  Sawyer .............................. 74/230.5

Primary Examiner—Leonard H. Gerin
Attorney—Otto John Munz

[57] ABSTRACT

A welded cable pulley has two concentrically kinked disc-shaped rings, connected with each other along the kinking line with the outer surface forming the groove for the cable, and the inner surfaces forming two webs extending in the direction of the pulley hub.

The weld connecting the disc-shaped rings along the kinking line is so dimensioned that it can be machined to suit the diameter of the respective cable, thus forming the cable groove.

The kinked surfaces of the disc-shaped rings which form the cable groove are filled with weld metal and are given an outward curvature.

The connection between the disc-shaped rings along the kinking line is effected by weld metal adapted to the strength of the cable pulley material. For the information of the cable groove and to provide the necessary machining allowance a weld metal is used which is adapted to the strength of the cable groove, and which is homogenously connected with the basic weld.

The outer edges of the disc-shaped rings are given an outward curvature.

4 Claims, 2 Drawing Figures

PATENTED DEC 4 1973 3,776,059

3,776,059

WELDED CABLE PULLEY

FIELD OF INVENTION

Class 74/230.8.

DESCRIPTION OF THE PRIOR ART

On the known types of cable pulleys the rims consisting of angular or flat stock which is bent into the shape of a ring is connected with the hub of the pulley by one or more disc-shaped rings, with the inner edge welded to the hub and the outer edge welded to the rim. On other known types of cable pulleys made of steel the disc-shaped rings are often replaced by spokes.

Rims of cable pulleys which are made of angular or flat stock have the disadvantage that they can only inaccurately be made to match a respective cable diameter. Therefore, the bearing surface for the cable requires machining. However, during such machining it is generally impossible to avoid undue weakening of the profiled rim, especially in cases where, due to inherent welding stresses, the rim exhibits an eccentricity or wobble and is no longer aligned with the bore of the hub.

SUMMARY OF THE INVENTION

It is the object of the present invention to provide a welded cable pulley which may generally be very easily produced and which generally excellently fulfills the requirements for welded cable pulleys.

According to the present invention there is provided a cable pulley consisting of two concentrically kinked disc-shaped rings which are welded together along the kinking line, with the outwardly facing surfaces forming the cable groove, and the inwardly facing surfaces forming the webs between the rim and the hub of the pulley.

According to another feature of this invention the welding seam connecting the disc-shaped rings along the kinking line is so dimensioned that it can be machined to match the respective cable diameter, thus forming the cable groove.

So as to avoid upon the machining of the cable groove an unintentional thinning of the walls of the disc-shaped rings, it is further proposed in accordance with this invention that an outwardly facing curvature is given to the surfaces of the disc-shaped rings forming the cable groove, the latter being filled with weld metal.

As it is the rule that the requirements in respect of the strength of the welding material used to connect the disc-shaped rings are less stringent than those for the cable groove which is subjected to considerable wear by abrasive forces caused by the cable, the service life of uniformly welded cable pulleys is not always satisfactory, especially under rough operating conditions. In the case of smaller cable pulleys this can be overcome by initially adapting the strength requirements for the cable groove to the strength of the bed of weld metal which connects the disc-shaped rings and also forms the cable groove.

In the case of cable pulleys with larger diameters and very voluminous weld metal fills with the required machining tolerances for the final dimensioning of the cable groove, a uniform weld metal fill to provide the proper cable groove would increase the manufacturing costs for the cable pulleys to a non-justifiable extent.

In accordance with this invention it is proposed as a solution in such cases that the connection of the disc-shaped rings along the kinking line is effected by a weld metal matching the strength of the cable pulley material, and that for the formation of the cable groove and to provide the necessary machining tolerance a weld metal is used, the strength of which is in accordance with that of the cable groove, and which is homogenously connected with the basic weld metal.

Finally, it is one of the characteristics of this invention that the outermost edges of the disc-shaped rings are given an outwardly facing curvature to protect the cable in the case of extending in a plane at an angle with the plane of rotation of the pulley.

DESCRIPTION OF THE PREFERRED EMBODIMENT

Figure 2:
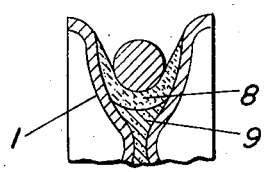
Figure 1:
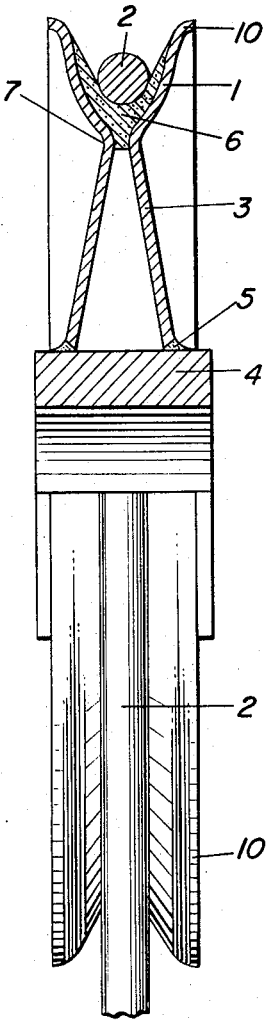

One of the embodiments of this invention is illustrated by the accompanying drawing where FIG. 1 shows a cable pulley with a machined cable groove consisting of weld metal, with a cable resting in the groove, the top half representing a sectional view, and the lower half representing a plan view, and FIG. 2 is a section through a cable groove consisting of weld metals of different qualities.

The cable pulley consists of two concentrically kinked disc-shaped rings on which the outer surfaces 1 with their outward curvature form the groove for the cable 2, whereas the inner surfaces 3 form the webs between the rim and the cable pulley hub 4, the connection with the latter being accomplished by welds 5. At the same time the cable groove which consists of weld metal 6 and can be machined to match the respective cable diameter, connects the disc-shaped rings along the kinking line 7 to form a cable pulley. On large diameter cable pulleys the cable groove consists of the weld metal fill 8 to suit the cable operating conditions, and the connecting weld 9 to suit the cable pulley strength. For cable protection the outermost edges of the disc-shaped rings are rounded 10.

What I claim is:

1. A welded cable pulley comprising two concentrically kinked disc-shaped rings which are connected with each other along the kinking line, with the outer surfaces forming the groove for the cable, and the inner surfaces forming the webs extending in the direction of the pulley hub, wherein
   the weld connecting the disc-shaped rings along the kinking line is so dimensioned that it can be machined to suit the diameter of the respective cable, thus forming the cable groove.

2. A welded cable pulley comprising two concentrically kinked disc-shaped rings which are connected with each other along the kinking line, with the outer surfaces forming the groove for the cable, and the inner surfaces forming the webs extending in the direction of the pulley hub, wherein
   the kinked surfaces of the disc-shaped rings which form the cable groove and are filled with weld metal are given an outward curvature.

3. A welded cable pulley comprising two concentrically kinked disc-shaped rings which are connected with each other along the kinking line, with the outer surfaces forming the groove for the cable, and the inner surfaces forming the webs extending in the direction of the pulley hub, wherein
   the connection between the disc-shaped rings along the kinking line is effected by weld metal adapted to the strength of the cable pulley material, and wherein for the formation of the cable groove and to provide the necessary machining allo-ance a weld metal is used which is adapted to the strength of the cable groove, and which is homogeneously connected with the basic weld.

4. A welded cable pulley comprising two concentrically kinked disc-shaped rings which are connected with each other along the kinking line, with the outer surfaces forming the groove for the cable, and the inner surfaces forming the webs extending in the direction of the pulley hub, wherein
the outer edges of the disc-shaped rings are given an outward curvature.

* * * * *